May 19, 1959  E. A. THOMPSON  2,887,098
VALVE TAPPET

Original Filed July 29, 1954  3 Sheets-Sheet 1

INVENTOR.
EARL A. THOMPSON
BY
ATTORNEYS.

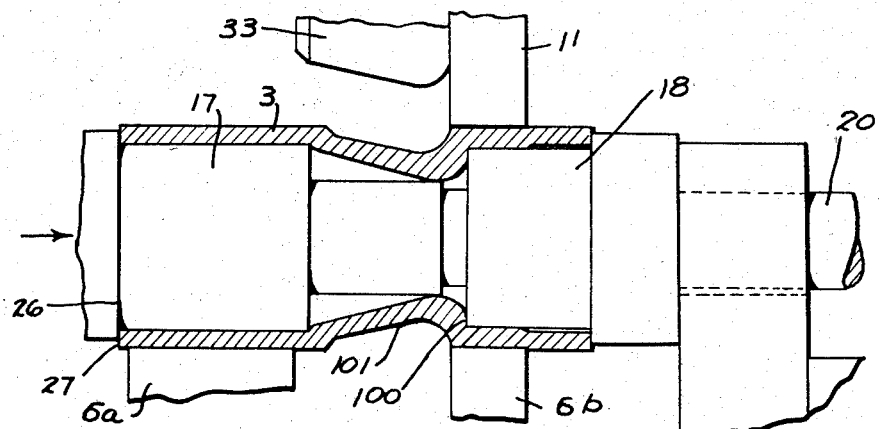
FIG.4
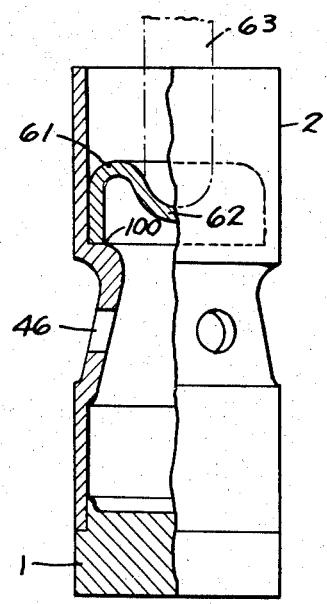
FIG.7
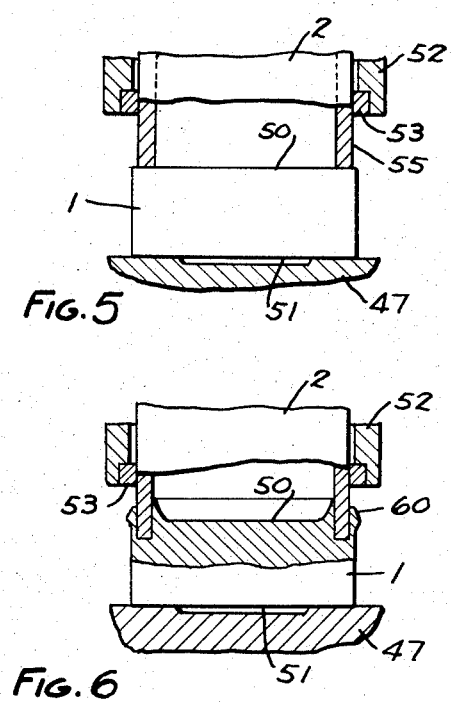
FIG.5
FIG.6
INVENTOR.
EARL A. THOMPSON
BY
ATTORNEYS May 19, 1959 E. A. THOMPSON 2,887,098
VALVE TAPPET
Original Filed July 29, 1954 3 Sheets-Sheet 3

INVENTOR
EARL A. THOMPSON

ATTORNEYS.

United States Patent Office 2,887,098
Patented May 19, 1959

2,887,098

VALVE TAPPET

Earl A. Thompson, Ferndale, Mich.

Original application July 29, 1954, Serial No. 446,497. Divided and this application June 18, 1957, Serial No. 666,287

9 Claims. (Cl. 123—90)

This invention relates to a valve tappet and the art of making a tappet.

This invention is a division of my co-pending application for Valve Tappet and the Art of Making a Tappet, Serial No. 446,497, filed July 29, 1954.

The invention is concerned with a tappet which is well adapted to perform its function in the current high-powered internal combustion automobile engine with its high tappet loading and in such engines as their horsepower is increased in the future.

In the competition for higher horsepower, designers have resorted to a number of expedients all of which have resulted in an increased performance demanded of the tappet. Some of these expedients include the increase of valve lift, the increase of total cam rise, the decrease of the mechanical advantage of the push rod upon the valve stem by changing the rocker arm ratio, the use of stronger valve springs and the increase in top engine speeds. All of these changes have made it more difficult to produce tappets having a satisfactory life, together with ability to operate a valve train reliably at high speeds.

The high unit contact pressure between the cam and the end face of the tappet require a good wearing metal such as hardened alloy cast iron for the end face of the tappet in order to provide the requisite hardness and bearing properties needed in modern engines. This has made it necessary to use tappets bored out from a solid cylinder of cast iron which is not only expensive to produce but results in a heavy tappet and further increase the contact forces because of the resultant inertia.

Not only do the engine designers require tappets with less weight and with harder and more durable bearing faces but there is also insistence that the improved properties be achieved without increase in cost and, desirably, even with a cost saving.

This invention contemplates a tappet having a thin rolled, light weight, steel body and an end piece, or base, of cast or sintered iron, or ferrous base alloys having a lower melting point than steel and which is either or both fused or mechanically joined to the body. Furthermore the invention contemplates a tappet having cylindrical walls with circumferential grooving and an internal shoulder.

Such a tappet may be provided by a spinning or rolling operation whereby the walls of a tubular steel blank are deformed to provide cannelures and to precisely size portions of the internal walls and then directly uniting a cast iron end piece with the body by fusion. In this manner a superior tappet may be produced which may have light weight tubular steel walls of varying diameter but with a continuous grain structure extending from end to end parallel to the internal and external surfaces. At the same time, the wearing surface at the end of the tappet may be of durable, long wearing material. Moreover the walls of the light weight tubular portion may blend with the end portion by an intimate molecular bond having a zone of gradually changing composition from the steel of the tubular walls to the cast iron of the end portion so as to produce a homogeneous structure which is truly a single piece of metal with widely differing compositions in its side and end portions.

Fig. 4 is a fragmentary view of the apparatus showing the tube after it has been upset longitudinally to form an internal shoulder therein.

Figs. 5 and 6 show the steps of one method for fusing the body and base of the tappet together.

Fig. 7 is an elevation, partly in section, showing one form of finished tappet.

Referring more particularly to the drawings there is shown in Fig. 7 a tappet comprising a base 1 and a hollow body 2 which has been made according to the method illustrated in Figs. 1 through 6 of the drawings.

The body 2 of this tappet is formed from a blank 3 preferably of low carbon steel tubing. Blank 3 is preferably welded low carbon steel tubing but, if desired, can be seamless tubing.

Figure 2:
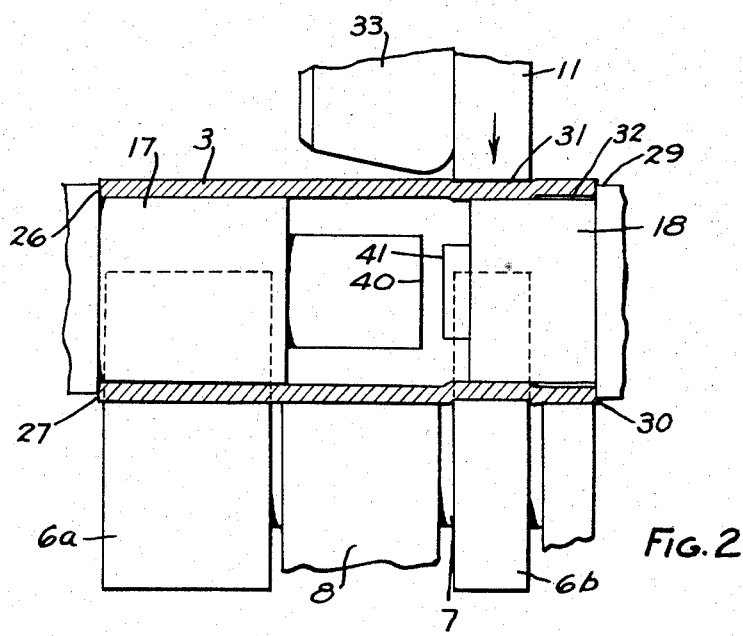
Fig. 2 is a fragmentary plan view of a rolling apparatus showing the first operation of rolling a portion of the tubular blank to reduce its diameter.
Figure 3:
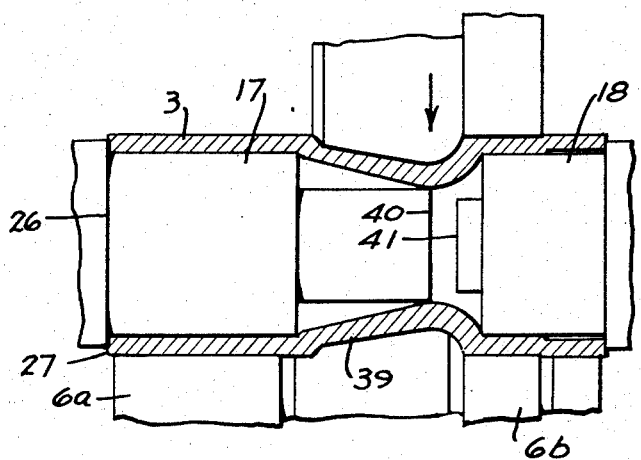
Fig. 3 is a fragmentary view of the apparatus showing the second step of rolling a shoulder in the tubular blank preparatory to the succeeding step of longitudinally upsetting the reduced portion of the tube.
Figure 1:
Fig. 1 is an elevation partly in section of a tubular body blank from which a tappet may be made in accordance with one born of the present invention.

The blank 3 is first subjected to a rolling or spinning operation on a suitable rolling machine having circumferentially distributed rollers 6a and 6b carried by a shaft 7 in a journal 8, together with independently shiftable rollers 11 and 33, as shown in Figure 2. Suitable mandrels 17 and 18 of the rolling machine support the blank 3. During the first operation illustrated in Figure 2, the roller 11 may spin the wall inwardly to a size determined by the mandrel 18. Thereafter the roller 33 may form a cannelure 39 in the wall as shown in Figure 3. Preferably the blank is compressed endwise by bringing the mandrel 17 inwardly against the mandrel 18 to form a shoulder, as indicated at 100, for the reception of a push rod seat 61, as illustrated in Figure 7. Such a method is illustrated more completely in the copending application previously referred to. Oil holes 46 are next drilled or punched in blank 3 and blank 3 may then be ground to size in a centerless grinder to thereby complete body 2, Fig. 7.

Body 2 as thus finished is next fused to the base 1. One method of performing the fusing operation is shown in Figs. 5 and 6. Base 1 with its upper and lower faces 50 and 51 ground to size and parallel is placed upon lower electrode 47. Body 2 is placed within upper electrode 52 and out of contact therewith except for contacting electrode ring 53. Upper electrode 52, 53 and lower electrode 47 are arranged to be connected into an electrical heating and welding circuit of suitable form. With the lower end of body 2 in contact with the upper face 50 of the base 1 and with sufficient pressure to form a good electrical contact without arcing, electrical current is applied and the current flows from upper electrode 52, 53 through the lower end 55 of body 2 through base 1 and into lower electrode 47 to heat these parts.

During this heating step the lower end 55 of the body 2 and the adjacent facial region of the base 1, which is in contact with the tube, are brought to the melting temperature of cast iron, that is, around 2300° F. The lower end of the steel body 2 during the heating step will be brought to approximately the same temperature as the adjacent facial area of cast iron base 1. Since the steel has a melting point approximately 2800° F. it will remain solid though somewhat deformable under pressure.

As downward pressure is applied to body 2 (the current being on), the adjacent area of base 1 will melt and the lower end 55 of body 2 will displace the molten metal or cast iron as it penetrates into the base 1 as shown. The outer diameter of the base 1 is slightly larger than the outer diameter of body 2 in order to get uniform heating of the surface of base 1 around its circumference. As the heated lower end 55 of the tube 2 penetrates into the locally melted area of the cast iron base, most of the molten cast iron from the base flows upwardly around the inner and outer diameters of the lower end of the tube 2 as at 60. After the tube penetrates the base to the requisite or desired depth, the current is cut off. The base 1 and body 2, which have now been fused together as above described, are removed from the welding machine. The outside diameter of the tappet assembly is then ground and thereafter carburized, quenched and tempered. After heat treatment the base is ground to the proper contour and the O.D. is ground to the correct limits. The piece is washed and a stamping 61 in the form of an inverted cup with dished center 62 which forms a socket for the lower end of push rod 63 is now set into the body 2 with the edge of cup 61 resting upon shoulder 100. The tappet is now complete and ready for use.

The difference in melting points between the steel body and cast iron base is set forth above by way of example. This difference in melting temperatures need only be sufficient so that the end of the steel body which penetrates the locally melted area of the base (which is of cast or sintered iron or ferrous base alloy) will not melt, or in any event will not melt sufficiently in depth to lose its penetrating power. This results in an intimately bonded junction wherein the steel of the tubular body and the iron at the base are merged into a single homogeneous piece having a unique micro structure exemplified by the showing in Figs. 8, 9 and 10.

Figure 8:
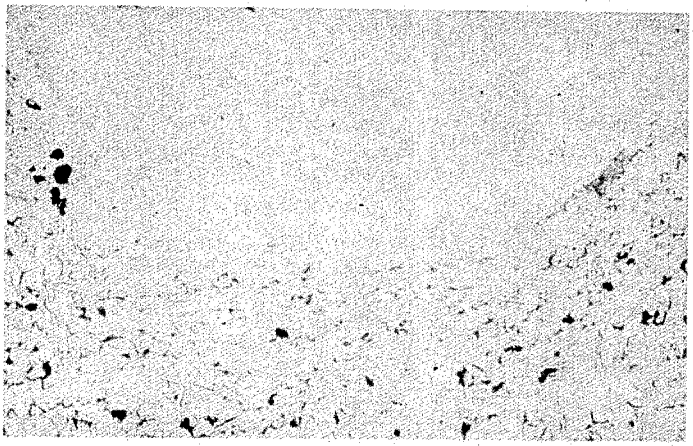
Figs. 8, 9 and 10 are photomicrographs of the fused area which are described more in detail below.

Fig. 8. This figure shows the typical appearance of the weld area in the unetched condition. One can see the cast iron with the graphite flakes, normal structure of this material, as well as the normal appearance of the low carbon steel.

It is important to note that there is not a continuous line of demarcation between the two alloys, but rather a zone in which the graphite flakes are fewer and smaller in appearance. This indicates that some of the original flakes did go into solution and were unable to precipitate out during the cooling process.

Figure 9:
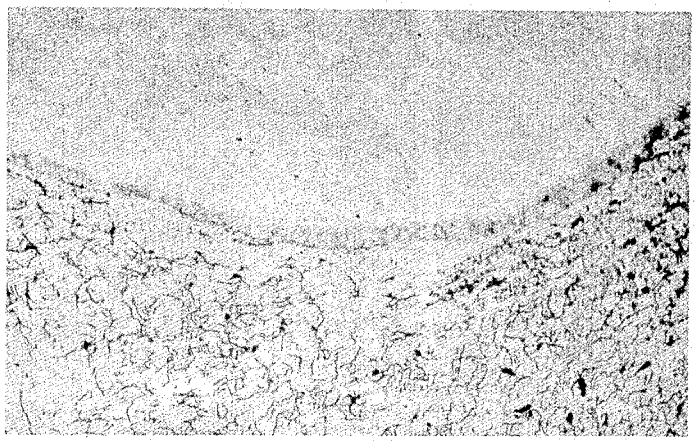

Fig. 9. This figure is of the same area as Fig. 8, and shows the appearance of the structure after a relatively light etch in Nital.

The light etching reveals a zone within the steel portion of high carbon content as indicated by the dark band. In this zone even at relatively low magnification one can see the penetration or diffusion of the carbon in a manner similar to the penetration and diffusion produced by a carburizing process.

It is also visible under the microscope that the higher carbon zone of steel merges into the original low carbon steel of the tube. This shows without doubt that carbon passed from the cast iron to the steel during the welding, and because of the rapidity of the cooling, micro-constituents of the type usually referred to as "martensite" were formed. These constituents appear as needle-like forms and impart to iron alloys relatively high hardness. As further evidence of the diffusion, one can see massive carbides (white constituents) which contain only combined carbon.

Because of the constituents present at the weld zone, the mechanical properties of the weld, and specifically ductility, are not at an optimum level after the welding operation. It becomes highly desirable, then, to subject the weld to a heat treating process by which the mechanical properties can be further improved. During this heat treating operation the steel portion or body of the tappet is carburized and hardened and the fusion area or joint between the cast iron base and the steel body is refined according to the structure shown in Fig. 10. The carburizing is done by a well known process at a temperature of about 1550° F. for about one hour to one hour and a quarter.

Figure 10:
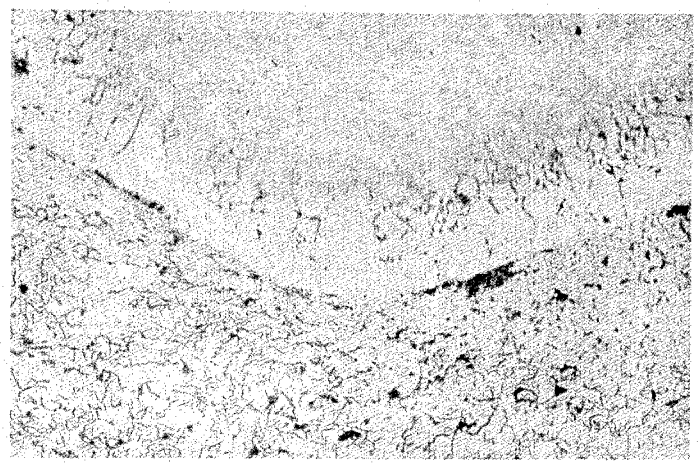

Fig. 10. This figure shows the structure of a weld thus improved by heat treating. The cast iron has hardly been affected while the original narrow band of high carbon has further diffused into the steel giving a more even gradient of carbon concentration from the cast iron, on one side, to the original low carbon steel, on the other.

Of further importance is the fact that, as in the "as weld" sample, the outer zone from which the flakes disappeared is yet free from graphite flakes, the carbon is now in the combined form, and no martensitic needles or massive carbides are present. Thus, by heat treating the sound weld, the general mechanical properties have been improved.

It will thus be seen that the present invention provides an improved light weight, long wearing tappet which is single, homogeneous piece of ferrous metal, which has tubular walls of steel having circumferential grooves and channels and a continuous grain structure from end to end extending parallel to the inner and outer tubular surfaces, while at the same time the end portion has a composition of high carbon, hardened cast iron with a gradual merging of the low carbon steel into the high carbon cast iron portions. Thus, there is provided a light weight structure having long wearing qualities which is essentially a one-piece construction, although having substantially different composition in its different portions.

While the form of embodiment of the invention as herein disclosed constitutes a preferred form, it is to be understood that other forms might be adopted, all coming within the scope of the claims which follow.

I claim:

1. A valve tappet comprising a low carbon steel tubular body element, a base element composed of a high carbon ferrous alloy whose melting point is lower than the melting point of said tubular element, and a joint connecting said elements, said joint composed of products derived from the melting of a portion of said base element, wherein one of said products is diffused into the low carbon tubular element.

2. A valve tappet comprising a steel tubular body portion, a base portion formed of a higher carbon ferrous alloy whose melting point is lower than the melting point of said tubular body portion, said base portion and said tubular body portion merging in a ferrous zone of substantial extent having a carbon content intermediate that of the steel and the higher carbon ferrous alloy.

3. A valve tappet comprising a low carbon steel tubular body portion, a base portion formed of a high carbon ferrous alloy whose melting point is lower than the melting point of said tubular body portion, said base portion and said tubular body portion merging in a ferrous zone of substantial extent having a carbon content intermediate that of the low carbon steel and the high carbon ferrous alloy.

4. A valve tappet comprising a low carbon steel tubular body portion, a base portion formed of a cast iron whose melting point is lower than the melting point of said tubular body portion, said base portion and said tubular body portion merging in a ferrous zone of substantial extent having a carbon content intermediate that of the low carbon steel and the cast iron.

5. A valve tappet comprising a low carbon steel tubular body portion, a base portion formed of a cast iron whose melting point is lower than the melting point of said tubular body portion, said base portion and said tubular body portion merging in a ferrous zone of substantial extent having a carbon content intermediate that of the steel and the cast iron, the carbon in said zone being in the combined form.

6. A valve tappet comprising a low carbon steel tubular body portion, a base portion formed of cast iron the melting point of which is lower than the melting point of the tubular body portion, said portions merging directly in a zone characterized by a microstructure in which the carbon appears as free graphite at one side of said zone and as combined carbon on the opposite side of the zone, the carbon content decreasing progressively from the region of free graphite to said region of combined carbon.

7. A valve tappet comprising a single homogeneous body of ferrous metal having a tubular steel skirt portion merging in a closed end portion of high carbon hardened cast iron, said skirt having walls of different diameters along the length to provide a groove on the exterior and a shoulder on the interior and having a grain contour extending continuously from end to end of the skirt and following parallel to the inner and outer surface contours of the skirt.

8. A valve tappet comprising a single homogeneous body of ferrous metal having a tubular steel skirt portion merging in a closed end portion of high carbon hardened cast iron, said skirt having walls of different diameters along the length to provide a groove on the exterior and a shoulder on the interior and having a grain contour extending continuously from end to end of the skirt and following parallel to the inner and outer surface contours of the skirt and said portions merging in a zone of progressively increasing carbon content from the cast iron to the steel.

9. As a new article of manufacture a light weight, long wearing cam follower element comprising a single homogeneous ferrous body having a cannelured cylindrical skirt portion of spun steel tubing with its end closed by a head portion of hardened cast iron, said portions being merged along a zone of substantial extent which comprises ferrous metal having characteristics intermediate those of the remainder of the head and skirt portions.

References Cited in the file of this patent
UNITED STATES PATENTS

| | | |
|---|---|---|
| 1,848,083 | Wetherald | Mar. 1, 1932 |
| 2,032,906 | Biewend et al. | Mar. 3, 1936 |
| 2,247,278 | Daisley | June 24, 1941 |